(12) United States Patent
Potin

(10) Patent No.: US 6,304,386 B1
(45) Date of Patent: Oct. 16, 2001

(54) DISPLAY DEVICE FOR HELMET-MOUNTED DISPLAY

(75) Inventor: Laurent Potin, Bordeaux (FR)

(73) Assignee: Sextant Avionique, Velizy Villacoublay (FR)

(*) Notice: Subject to any disclaimer, the term of this patent is extended or adjusted under 35 U.S.C. 154(b) by 0 days.

(21) Appl. No.: 09/446,363

(22) PCT Filed: Jun. 19, 1998

(86) PCT No.: PCT/FR98/01294

§ 371 Date: Dec. 20, 1999

§ 102(e) Date: Dec. 20, 1999

(87) PCT Pub. No.: WO98/59272

PCT Pub. Date: Dec. 30, 1998

(30) Foreign Application Priority Data

Jun. 20, 1997 (FR) .................................................. 97 07711

(51) Int. Cl.[7] .............................. G02B 27/14; G02B 27/12
(52) U.S. Cl. ........................... 359/630; 359/632; 359/639
(58) Field of Search .................................. 359/630, 631, 359/632, 633, 637, 638, 640; 345/7, 8, 9

(56) References Cited

U.S. PATENT DOCUMENTS

| | | | | |
|---|---|---|---|---|
| 3,870,405 | * | 3/1975 | Hedges .................................. | 359/631 |
| 4,468,101 | * | 8/1984 | Ellis ...................................... | 313/524 |
| 4,761,056 | * | 8/1988 | Evans et al. ......................... | 359/631 |
| 4,775,217 | * | 10/1988 | Ellis ...................................... | 313/524 |
| 4,828,378 | * | 5/1989 | Ellis ...................................... | 359/400 |
| 4,961,626 | * | 10/1990 | Fournier, Jr. et al. ............... | 359/630 |
| 5,459,612 | * | 10/1995 | INgleton .............................. | 359/630 |
| 5,646,783 | * | 7/1997 | Banbury ............................... | 359/630 |
| 5,917,656 | * | 6/1999 | Hayakawa et al. .................. | 359/637 |
| 6,195,206 | * | 2/2001 | Yona et al. ........................... | 359/630 |

* cited by examiner

Primary Examiner—Georgia Epps
Assistant Examiner—Saeed Seyrafi
(74) Attorney, Agent, or Firm—Oblon, Spivak, McClelland, Maier & Neustadt, P.C.

(57) ABSTRACT

A display device for a helmet-mounted visual system including an intensified image-taking device and a visor to combine the intensified images and an ambient scene before the pilot's eyes. The display device also includes an optical prism whose optical aberrations (image distortions, astigmatism) are capable of compensating for the aberrations created by the visor of the helmet, on the images given to the pilot.

10 Claims, 5 Drawing Sheets

DISPLAY DEVICE FOR HELMET-MOUNTED DISPLAY

BACKGROUND OF THE INVENTION

1. Field of the Invention

An object of the present invention is a device enabling the manufacture of light-weight, ergonomic helmet-mounted visual display systems, in which a luminous image is seen in a state where it is superimposed on the view of the outside scene.

2. Background of the Invention

This type of helmet-mounted visual system is used in aeronautics, the observer being the pilot of an airline or helicopter.

In particular, warplanes or combat helicopters require the presentation of piloting and firing control information as well as intensified images of the surroundings of the airline or helicopter. All this information may be presented on a head-up visor present in all warplanes and in certain helicopters.

The drawback of this type of display is that it can present an image only in a limited field that is always centered on the axis of the aircraft while the pilot may have to take sightings at a distance from the axis of the aircraft. This is why, at present, display devices are integrated into the pilot's helmet, with the pilot carrying the field of display with him. Integrated devices of this kind enable the pilot to keep autonomous systems, especially intensified image-taking systems, with him. These may comprise in particular an image-taking objective coupled with a light intensifier, a relaying optical system for the projection, on the visor of the helmet, of an image that is sent back towards the pilot's eyes in being superimposed on an ambient scene.

Despite these advantages, the presentation of the image on a visor suffers from defects inherent in its use in projection on a tilted visor.

These defects are in particular of two kinds: the first kind relates to image distortion. Indeed, owing to major variations of incidence on the visor due to its inclination as a function of the field observed, the image projected on a visor is distorted (this is often called the second type of off-center distortion).

The second kind of defect relates to the astigmatism introduced into the image. The tilting of the visor has, for a given field, an influence on the quality of the image within one and the same field: the radius of curvature seen along a given plane differs from that observed along a plane orthogonal to the first plane. The rays, with respect to these two planes, therefore get focused at different places.

To compensate for these optical defects, certain solutions have been considered. In particular, it is possible to use a toroidal visor to compensate for distortion and astigmatism.

However, the designing of a toroidal visor remains difficult to implement.

Another approach consists of the introduction, after the image-taking objective, of an optical aberration correction device using a CCD circuit and then a cathode-ray tube to recreate a corrected image. A device of this kind increases the weight of a pilot's helmet and generally calls for a high voltage supply that is incompatible with an independent system capable of being carried with the pilot when he ejects.

SUMMARY OF THE INVENTION

To overcome these different drawbacks, the invention proposes a display device for a helmet-mounted visual system using at least one optical prism having optical aberrations that are capable of compensating for the distortion and astigmatism type of aberrations created by the visor in the images.

Indeed, in a prism, at refraction during the passage between the air and the middle of the prism, the non-linearity of the variations of incident angles and refracted angles induces an image deformation of the same type as the one shown in FIG. 1. FIG. 1 pertains to a matrix of dots of an undistorted image. FIG. 1b pertains to a matrix of image dots distorted by the visor. Furthermore, the optical prism has an invariance by translation along a particular plane. Its properties of refraction therefore differ within one and the same field between this plane and the plane that is orthogonal to it. This phenomenon is similar to astigmatism.

More specifically, an object of the invention is a display device for helmet-mounted visual systems comprising:

an intensified image-taking device delivering a first optical beam;

a visor;

means for the superimposition, before an observer, of an outside scene and the first optical beam delivered by the intensified image-taking device through an relaying optical system;

characterized in that the relaying optical system comprises at least one optical prism to compensate for the distortion and astigmatism introduced by the visor on said first optical beam.

The display device for a helmet-mounted visual system may advantageously furthermore comprise an image generator,emitting a second optical beam that carries information, and a mixer so as to superimpose the first optical beam and the second optical beam, at the relaying optical system.

According to one variant of the invention, the means used to superimpose an outside scene and the intensified images taken are integrated into the visor.

According to another variant of the invention, the means used to superimpose an outside scene and the intensified images taken comprise an independent combiner made of glass.

Indeed, the invention can also be applied in the case of a combiner not integrated into the visor which may have a curved reflecting surface as shown in FIG. 2, this reflecting surface creating the same type of distortion is as a visor. This type of combiner comprises a curved reflecting surface Sc with a center of curvature C, coupled with a complementary prism PC to direct the optical beam of intensified images or synthetic images L towards the pilot's eye 11.

To improve the performance characteristics of the device without encumbering it, the optical prism may comprise means to make the optical beams perform at least one outward journey and one return journey in said optical prism.

The optical prism used in the device according to the invention may advantageously comprise a curved face so as to approach the visor effect for improved compensation of the optical aberrations introduced by the visor.

BRIEF DESCRIPTION OF THE DRAWINGS

The invention will be understood more clearly and other advantages shall appear from the following description given on a non-restrictive basis with reference to the appended figures, of which.

DESCRIPTION OF THE PREFERRED EMBODIMENTS

According to a first variant of the invention, the display device has only one prism working in transmission mode, the means for the superimposing of images and of the outside scene being integrated into the visor.

Figure 3:
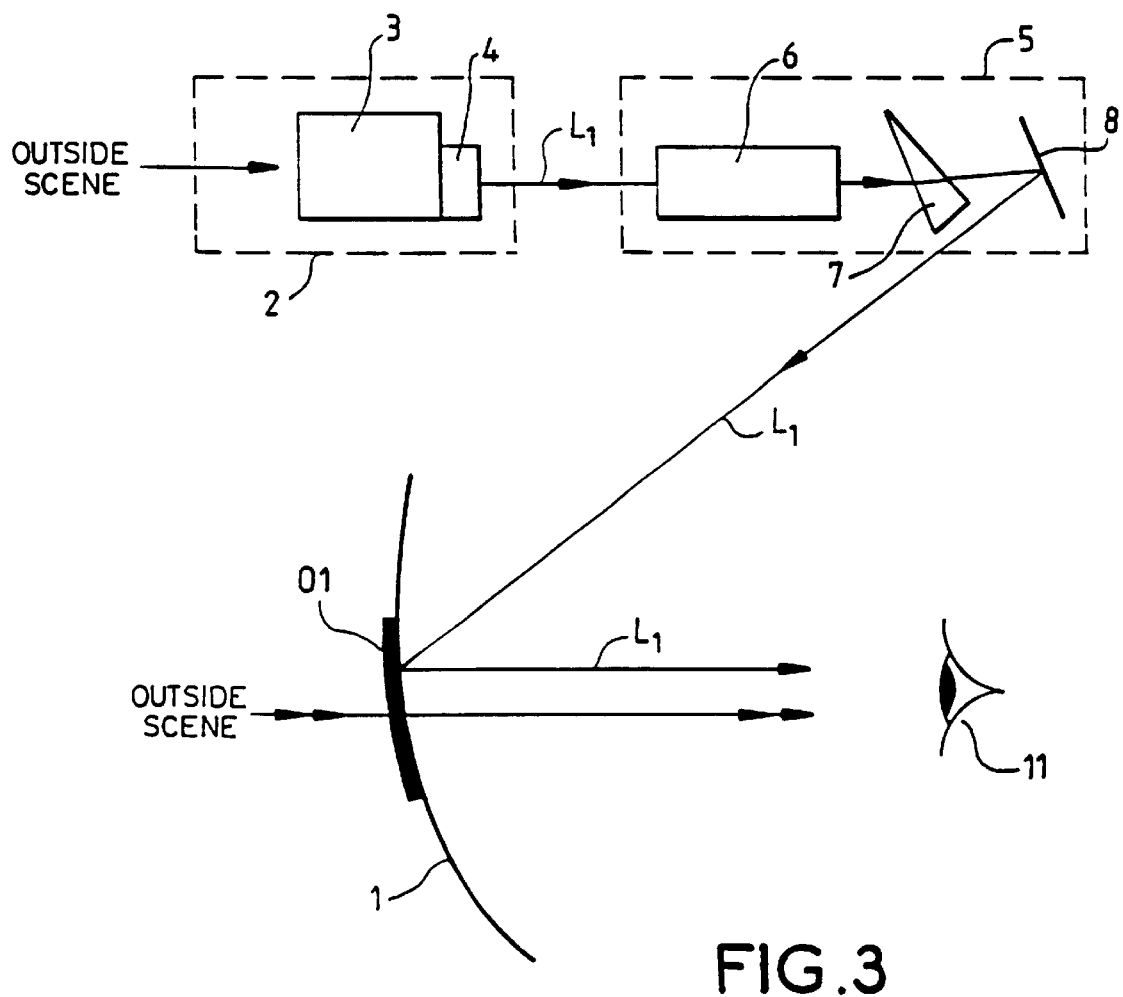
FIG. 3 illustrates a first exemplary display device for a helmet-mounted visual system according to the invention comprising a prism working in transmission mode.

As shown in FIG. 3, the helmet-mounted visual system comprises a visor 1 that has locally undergone a dielectric or holographic type surface treatment 01 in order to reflect a light beam that is a carrier of intensified images L1, while at the same time enabling the transmission of an outside scene. The light beam L1 is created from a device 2 comprising an image-taking objective 3 and a light intensifier 4. The light intensifier comprises a photocathode at input and a cathode-ray screen at output. The photons received on the image-taking objective are converted into electrons by the photocathode. The light intensifier accelerates and multiplies these electrons to finally form an intensified image on its cathode ray screen. This intensified image is sent through an relaying optical system 5 consisting in particular of a certain number of lenses 6 and transmission means 8 to direct the intensified image towards the visor. The relaying optical system also comprises the optical prism 7. The pilot's eye 11 thus observes the beam of intensified images Li and the outside scene.

Figure 4:
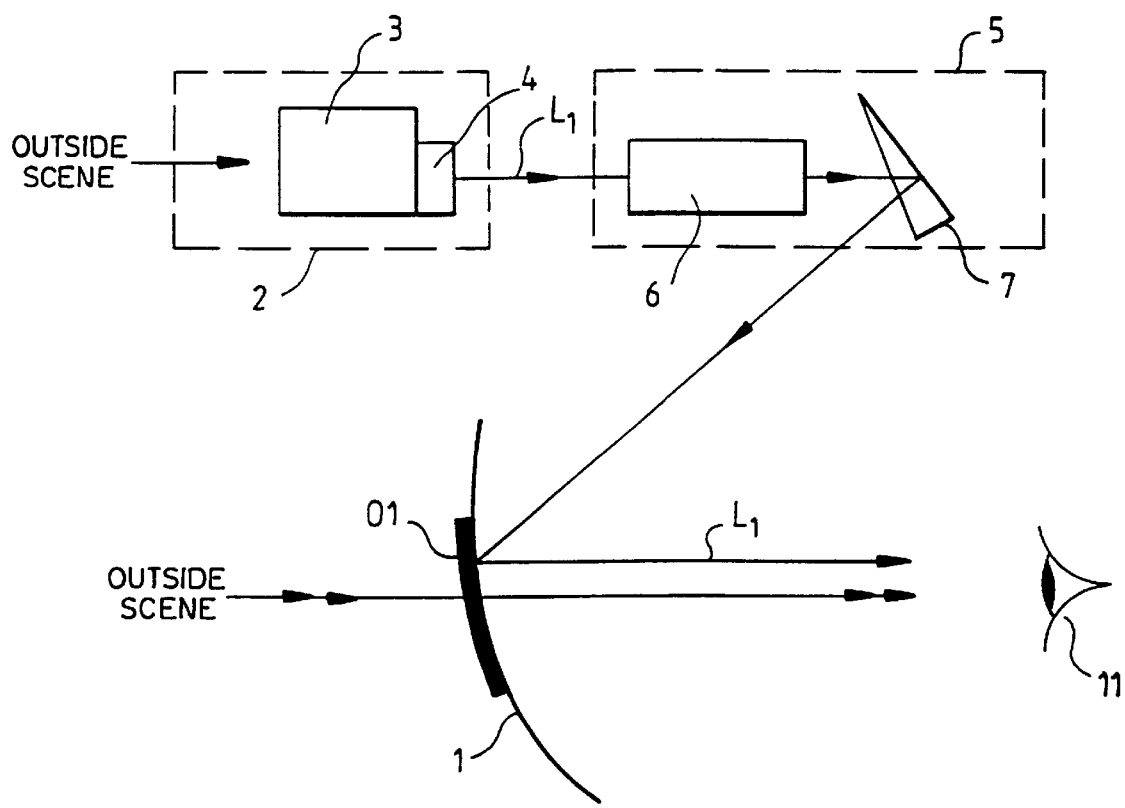
FIG. 4 illustrates a second exemplary display device for a helmet-mounted visual system according to the invention comprising a prism working in reflection mode.

According to a second variant of the invention, the display device comprises a prism working in reflection mode. One of the major constraints of helmet-mounted visual systems is the fact that the currently used systems are bulky. Any gain in mass obtained in each of the elements of the helmet-mounted visual system is important. This is why, it may be particularly worthwhile to duplicate the passage of a light beam in the medium used to correct optical aberrations, in this case the optical prism. This double passage makes it possible to reduce the weight of the optical prism used by a factor of 2. This amounts to a major advantage in the case of prisms made of glass having a high optical index but also high density. The display device of this variant shown in FIG. 4 is very similar to the device shown in FIG. 3. In this variant, the transmission means are integrated into the optical prism which works in reflection mode.

Figure 5:
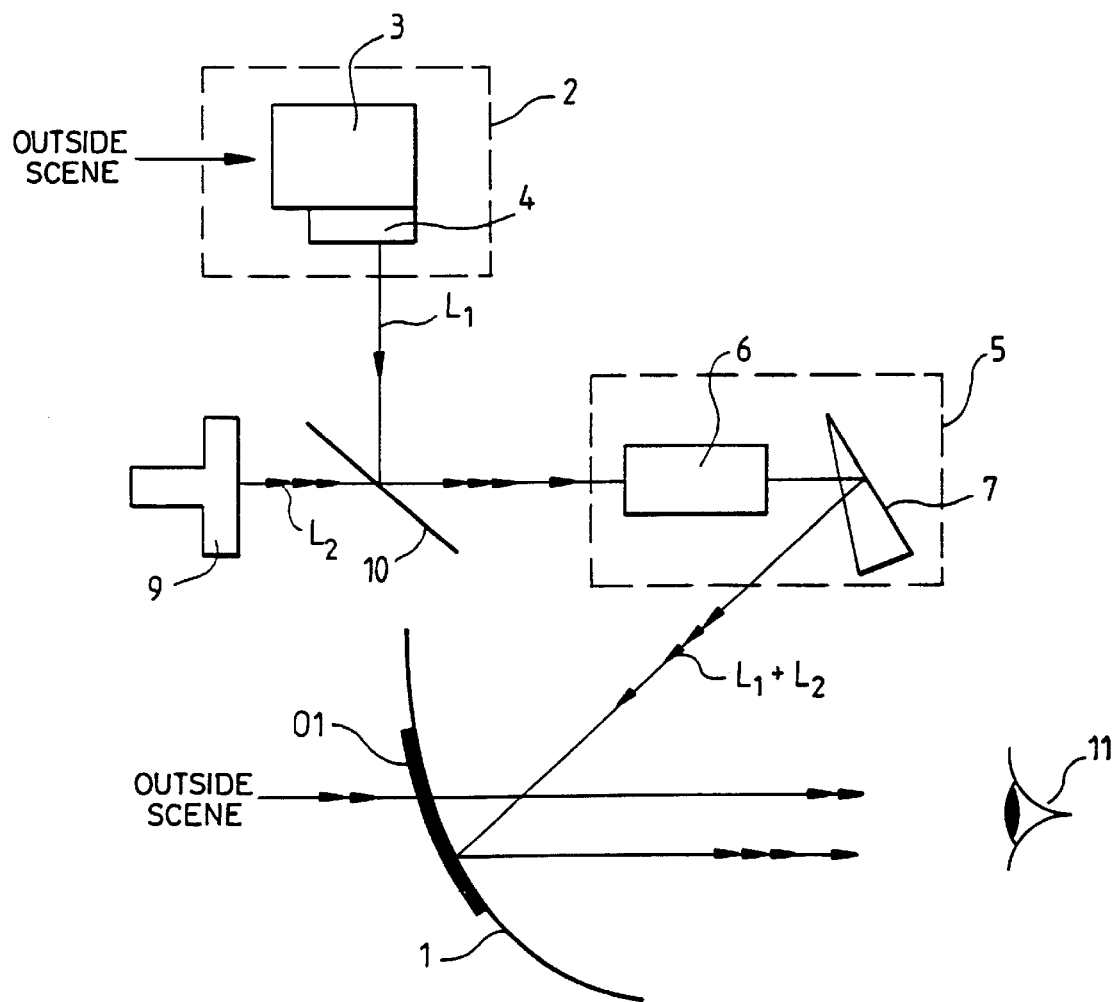
FIG. 5 illustrates a third exemplary display device for a helmet-mounted visual system according to the invention comprising an image generator.

According to a third variant of the invention, the helmet-mounted visual system furthermore comprises an image generator enabling the information to be superimposed on the images perceived by the pilot. This variant of the invention is shown in FIG. 5.

In addition to the image-taking device 2, the helmet-mounted visual system comprises an image generator 9 which, for example, may be a symbol generator generating a light beam L2. It also comprises a mixing optical system 10 receiving, firstly, the intensified images borne by the light beam L1 and, secondly, the images created by the image generator and borne by the light beam L2.

According to other variants of the invention, the optical beams L1 and L2 may perform more than one outward and return journey in the optical prism. This may be sought notably for an optical prism made of plastic, which is advantageous in terms of weight as compared with glass but has a refraction index (close to 1.5) smaller than that of the types of glass used (close to 1.8) and therefore introduces fewer optical corrections.

Figure 1A:
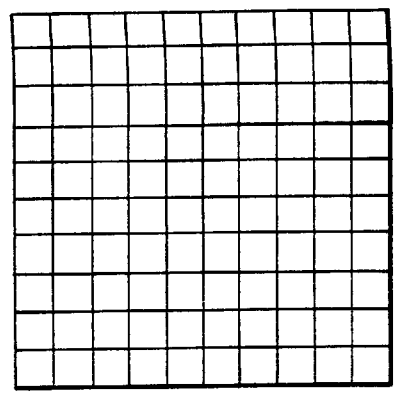
FIGS. 1a and 1b illustrate the image distortions created by the curvature of a helmet visor.
Figure 1B:
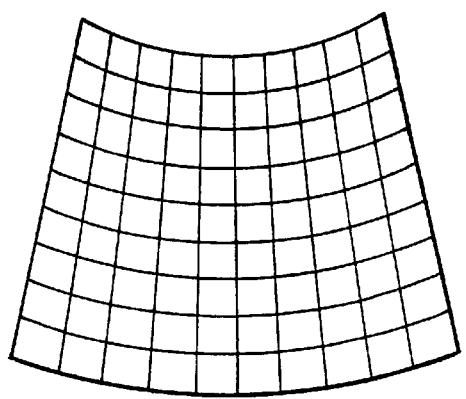
Figure 6:
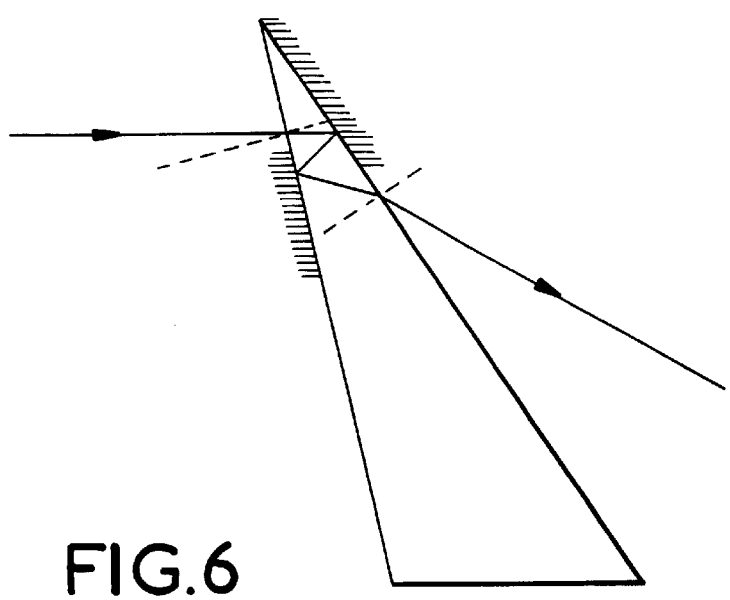
FIG. 6 illustrates an exemplary prism used in the invention.
Figure 2:
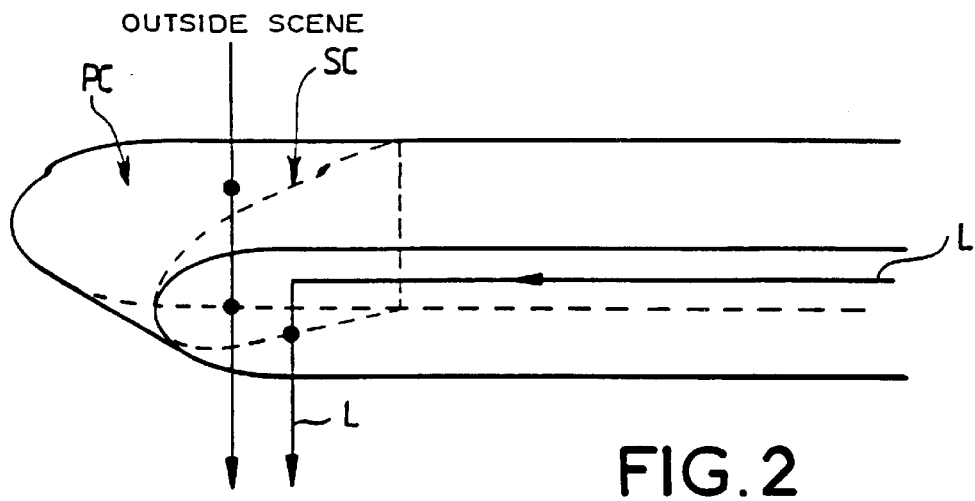
FIG. 2 illustrates an exemplary combiner used in a display device according to the invention.

For this purpose, the optical prism may be provided with a reflective treatment on one part only of one of its faces and also at least on one part of another one of its faces as illustrated in FIG. 6.

The optical prism used in the invention may also comprise, on one of its faces, a treatment that is selective in terms of angle of incidence.

Figure 7:
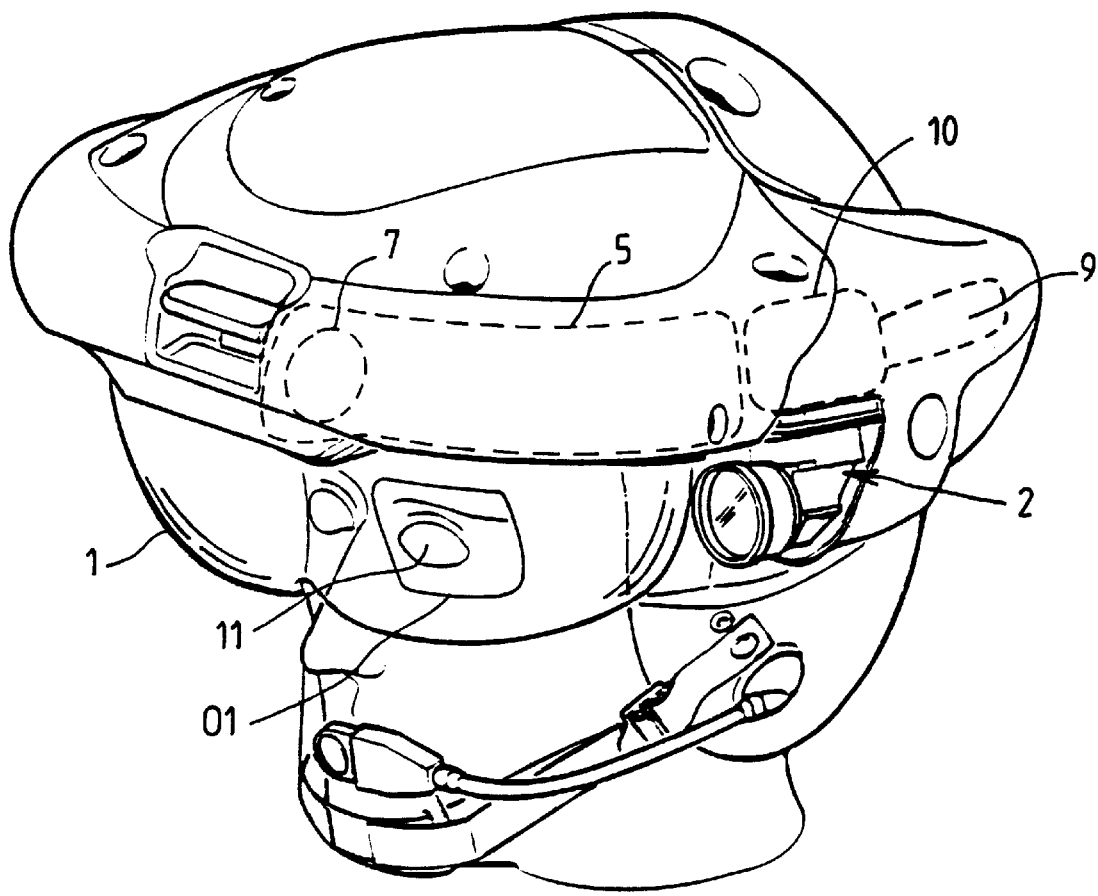
FIG. 7 illustrates an exemplary helmet using a device according to the invention.

FIG. 7 illustrates a helmet fitted out with the display device described here above with reference to FIG. 5. The helmet is a binocular version used to project information on both eyes of the pilot.

The pilot's helmet has two first lateral housings for the image-taking devices 2, two second lateral housings for the image generators 9 which can be located above said first lateral housings and two mixers 10. The helmet also has a set of two relaying optical systems 5 and two prisms 7, at the output of which the generated images and the intensified pictures taken may be superimposed on the outside scene before the pilot's eyes 11.

In FIG. 7, only the left-hand display device integrated into the helmet is shown. The same device (not shown) is integrated into the right-hand part of the helmet.

What is claimed is:

1. Helmet-mounted visual system comprising:
   an intensified image-taking device configured to deliver a light beam;
   a visor;
   means for superimposing, before an observer, an outside scene viewed through the visor and the light beam delivered by the intensified image-taking device;
   a relaying optical system located between the intensified image-taking device and the visor, wherein the relaying optical system comprises at least one optical prism to compensate for a second type of off-center distortion and astigmatism introduced by the visor on the light beam delivered by the intensified image-taking device; and
   wherein the visor singly covers both eyes of the observer.

2. Helmet-mounted visual system according to claim 1, further comprising:
   an image generator configured to emit an information carrying light beam; and
   a mixer configured to superimpose the light beam delivered by the intensified image-taking device and the information-carrying light beam at the relaying optical system.

3. Helmet-mounted visual system according to claim 1, wherein the intensified image-taking device comprises an image-taking objective, and a light intensifier.

4. Helmet-mounted visual system according to claim 1, wherein the visor comprises a semi-reflective treated surface configured to superimpose, before the observer, the outside scene and the light beam delivered by the intensified image-taking device or the outside scene and the light beam delivered by the intensified image-taking device superimposed with an information-carrying light beam.

5. Helmet-mounted visual system according to claim 1, wherein the visor comprises a holographic treated surface configured to superimpose, before the observer, the outside scene and the light beam delivered by the intensified image-taking device or the outside scene and the light beam delivered by the intensified image-taking device superimposed with an information-carrying light beam mixer.

6. Helmet-mounted visual system according to claim 1, further comprising a combiner made of glass configured to superimpose, before the observer, the outside scene and the light beam delivered by the intensified image-taking device or the outside scene and the light beam delivered by the intensified image-taking device superimposed with an information-carrying light beam.

7. Helmet-mounted visual system according to claim 1, wherein the optical prism comprises means for making the light beam delivered by the intensified image-taking device or the light beam delivered by the intensified image-taking device superimposed with an information-carrying light beam perform at least one to-and-fro journey in said optical prism.

8. Helmet-mounted visual system according to claim 6, wherein the optical prism comprises two faces that are at least partially reflective for the light beam delivered by the intensified image-taking device or for the light beam delivered by the intensified image-taking device superimposed with an information-carrying light beam.

9. Helmet-mounted visual system according to claim 6, wherein the optical prism comprises a face with a treatment the treated face being selectively transparent or reflective based on angle of incidence of the light beam delivered by the intensified image-taking device and the information-carrying light beam.

10. Helmet-mounted visual system according to claim 1, wherein the optical prism comprises a face that is curved to increase compensation for the second type of off-center distortion and the astigmatism introduced by the visor on the light beam delivered by the intensified image-taking device or on the light beam delivered by the intensified image-taking device superimposed with an information-carrying light beam.

* * * * *